Dec. 24, 1940.　　　　L. F. STROUT　　　　2,225,759
SPRAY GUN NOZZLE AND VALVE
Filed Sept. 7, 1938　　　2 Sheets-Sheet 1
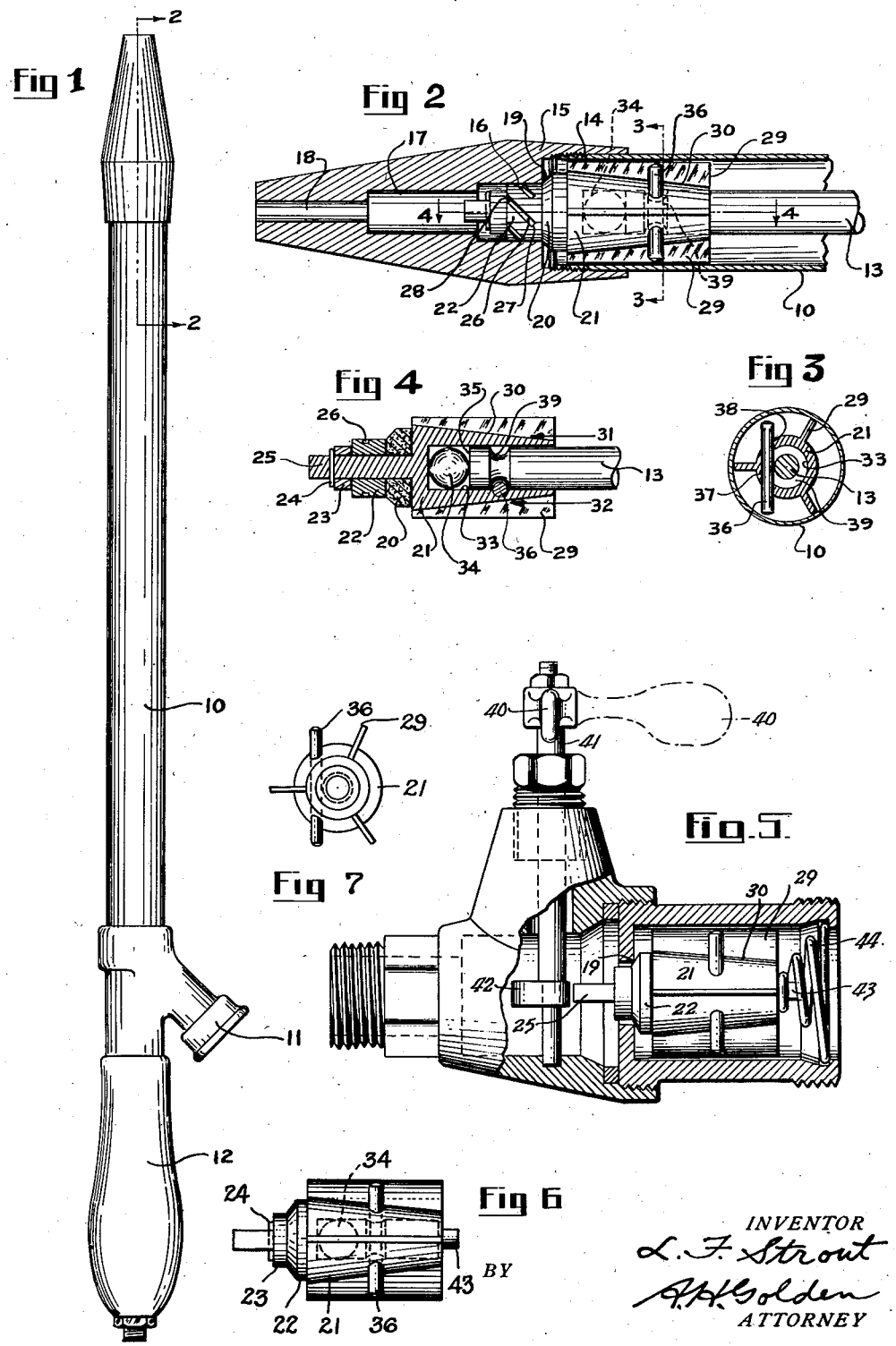
INVENTOR
L. F. Strout
BY
A. H. Golden
ATTORNEY Dec. 24, 1940.    L. F. STROUT    2,225,759
SPRAY GUN NOZZLE AND VALVE
Filed Sept. 7, 1938    2 Sheets-Sheet 2
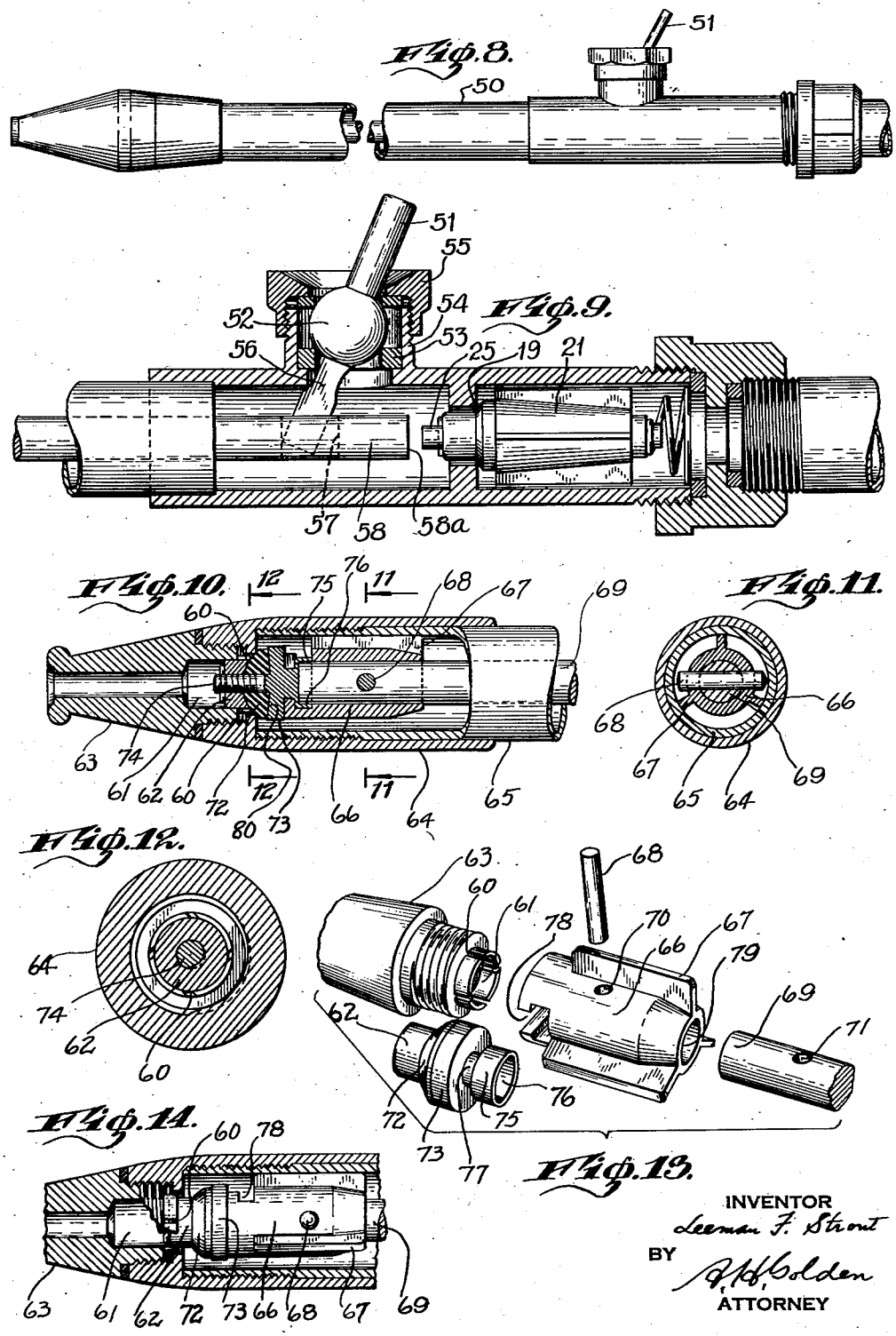

Patented Dec. 24, 1940

2,225,759

UNITED STATES PATENT OFFICE 2,225,759

SPRAY GUN NOZZLE AND VALVE

Leeman F. Strout, Stamford, Conn.

Application September 7, 1938, Serial No. 228,877

10 Claims. (Cl. 299—118)

This invention relates to a spray gun, and more particularly to the nozzle and valve construction of a spray gun. This application is a continuation in part of my application Serial No. 47,353, filed October 30, 1935, allowed March 8, 1938.

In spray guns of the type used by tree surgeons, it is sometimes necessary to work with liquid pressures up to eight hundred pounds per square inch. It is readily seen that under such great pressures, it is necessary to have exceedingly efficient cut-off valves, and also exceedingly efficient spray nozzles and spray creating members.

My invention relates especially to a combined nozzle and valve mechanism which is extremely efficient in permitting an easy cut-off at the very highest of pressures, and in allowing for the control of the spray in a most efficient manner. Heretofore, it has been exceedingly difficult to obtain a good spray adjustment, especially at high pressures. I have conceived a construction permitting me to utilize very high pressure, and yet so control the spray and volume that I am able to spray tiny shrubs and also also tall trees, all with the same nozzle and with the same pressure, using the spray control to obtain the necessary volume and type of spray.

As a preferred feature of my invention, I use a cut-off valve body having a series of fins thereon supporting the same in a pipe forming the main body of my spray gun. Preferably, the valve body is tapered upwardly toward the valve seat against which it moves, and in the direction of the fluid pressure so that the pressure may act on this tapered body tending to force it against the valve seat. Preferably, however, I rely on a thrust rod of the rotating screw type well known in this art for moving the valve body against its seat.

As a further feature of my invention, I preferably incorporate between the thrust rod and the valve body a ball functioning as a ball bearing, whereby the rotating rod will apply thrust to said valve body moving it firmly against the valve seat while not imparting rotation thereto. For moving the valve body against the valve pressure and away from the seat, I utilize the same thrust rod, using a very simple form of assembly embodying a pin and slot which I believe to be extremely novel and especially adapted for use in this art.

A further feature of my invention resides in the use of a spray forming member having water whirling grooves therein. Preferably but not necessarily, this member is integrally movable with the valve body and is formed as an extension of the valve body, and is mounted in juxtaposition to that portion of the valve body which is the actual valve seat cooperating part of the body. Preferably also, I form the grooves in this water whirling member of graduating depth, and I terminate these grooves at a point on the periphery of the member maintained within a spray forming bore at the time that the valve body is against its seat. It is only after the valve body has moved off its seat that the portion of the member forming the starting point of the grooves is exposed outside of the spray forming bore. In this way, I am able to control the volume of the spray and the consistency of the spray because of the fact that it is only after the valve permits the flow of water that the grooves are exposed for forming the whirling spray; the further out the spray forming member moves from the bore, the heavier the spray and the greater the volume of the spray.

As indicated previously, the valve body has fins thereon. These fins not only serve to maintain the valve body in position in the pipe, but they may serve also to retain it against rotation such as might be imparted by reaction of the water with the grooves of the spray forming member, the water cooperating with the films to maintain the body against rotation and overcoming the reaction of the water to the spray forming grooves.

As a further feature of my invention, I utilize a modification in which the spray forming grooves are formed in the spray forming bore rather than on a movable member. In this modification, I obtain the same control as in the previous modification, that is, the spray forming grooves are allowed to function only after the valve body is first moved off its seat. I also have an additional modification in which the valve body and the spray forming member are not unitary, but rather are in two parts movable individually. As a further feature of my invention, I also incorporate the particular valve body in an arrangement useful for faucets or valves per se. There are undoubtedly many other features of the invention which will be appreciated by those skilled in this art, such as the means I use for securing the rubber washer of my valve body, which are extremely valuable as contributions to the art, and which will be pointed out hereinafter. It should be indicated also that while I shall show and describe specific forms of my invention, I feel that I have made a relatively broad contribution to the art, and I do not therefore wish to be limited in my monopoly except as required by the state of the art.

Referring now to the drawings, Fig. 1 is a view of a gun of the type to which my invention is applied. Fig. 2 is a view along lines 2—2 of Fig. 1, while Fig. 3 and Fig. 4 are respectively sectional views taken along lines 3—3 of Fig. 2 and lines 4—4 of Fig. 2. Fig. 5 is a partial section of a modification of my invention. Fig. 6 is a side view of the valve body of Fig. 5, while Fig. 7 is an end view thereof. Fig. 8 is a plan view of a further modification of the invention. Fig. 9 is a section through the modification of Fig. 8. Fig. 10 is a section through a modification of my invention wherein I utilize a spray forming bore in which are formed water whirling grooves. Also, in the form of invention illustrated in Fig. 10, I show a novel type of valve body and means for securing to that valve body the spray forming member and a rubber washer. Figs. 11 and 12 are sections respectively along lines 11—11 and 12—12 of Fig. 10. Fig. 13 is an exploded perspective view of the parts of Fig. 10. Fig. 14 is a partial section substantially along the same lines as Fig. 10 showing certain of the parts.

Referring now more particularly to the drawings and especially to Figs. 1-4, inclusive, reference numeral 10 represents the main body portion of a spray gun having an intake portion 11 and a control handle 12, which control handle is adapted to rotate and by this rotation to impart longitudinal movement to the thrust rod 13 illustrated in Fig. 2. The construction of handle 12 and thrust rod 13 is well known in the art and need not be shown in detail here. The upper end of the gun body or main pipe portion 10 is threaded at 14, and is adapted to receive through these threads a nozzle portion 15. This nozzle portion might be integral, of course, with the body 10, but for manufacturing purposes it is probably best made as I have illustrated it. The nozzle 15 has a spray forming bore 16 and further bores 17 and 18, all of which will be well understood by those skilled in the art. The spray forming bore 16 runs from a valve seat 19 presenting a right angled edge to a fiber member 20 carried by the valve body 21 mounted within the pipe portion 10. The portion 20 may be of fiber or of any other suitable material, depending on the chemical analysis of the liquid to be forced through the pipe 10. In a modified form of my invention described below, I show a rubber washer held in place by novel means which make possible the use of a rubber washer.

The fiber member 20 will be maintained against the end surface of the valve body 21 through means of a spray forming member 22, a metal washer 23 and a cotter pin 24, all mounted on the rod 25 forming an integral extension of the valve body 21. It will be noted that the member 22 is substantially the same size as the diameter of the bore 16, and therefore prevents the blowing off or the forcing off of the fiber member 20. Even in those modifications where member 22 is not a spray forming member, it will nevertheless function as in this modification to hold fiber member 20 against the heavy pressures used in devices of this sort.

The spray forming member 22 is equipped with a series of spray forming grooves 26 which preferably extend substantially 90° on the circumference or outer periphery of the member 22, and these grooves 26 are of varying depth, beginning at 27 directly on the periphery of the member 22 and terminating in a relatively deep end 28.

It will be noted that the beginning 27 of each of the grooves 26 is at a point within the bore 16 when valve body 21 is positioned with the fiber member 20 against the seat 19, as is quite apparent from Fig. 2. Thus, even if water were allowed to flow past the seat 19, it would not enter any of the grooves 26 in the position of the parts in Fig. 2.

It is only after the fiber member 20 is moved off seat 19 that the spray forming member 22 is moved sufficiently to the right from its position of Fig. 2 to expose the grooves 26. It is only thereafter that spray may be formed by those grooves. Naturally, the further out of bore 16 the member 22 is moved, the deeper the portions of the grooves exposed to the water or other fluid, and the greater the volume and heavier the consistency of the spray formed. All this it is thought will be quite clear to those skilled in the art.

It will be noted that the valve body 12 is equipped with a series of three fins 29 formed integrally therewith. The body 21 is adapted through these fins to be supported in the pipe 10 for free rotation therein. It will be appreciated that since the valve body may thus rotate freely, reaction of water or other fluid with the grooves 26 of the member 22 would ordinarily tend to rotate the body and member 22, resulting in a relatively poor action.

The fins 29 cooperate with the water or other fluid to overcome this tendency to rotate and thus maintain the valve body and member 22 against substantial rotation. It will also be noticed that the valve body member 21 from which the fins 29 extend is tapered as at 30. The water strikes against this tapered surface in the direction of arrows 31 and 32 and tends through this water pressure to force the valve body to the left in Fig. 2 and firmly against its seat 19, assisting the action of the thrust rod 13. This gives a very fast closing action, and is especially adapted for such constructions wherein a thrust rod such as 13 may not very well be utilized or requires assistance, or where a fast and complete cut-off is necessary.

For the utilization of rod 13, the valve body 21 is drilled out as at 33 and houses a thrust ball 34 against which the end 35 of the rod 13 is adapted to press. Naturally, other equivalent constructions may be used and will of course readily suggest themselves to those skilled in the art. I believe the particular assembly is especially well adapted for this art, however. It is readily seen that rotation of the rod 13 while said rod is moving endwise will cause ball 34 to impart thrust movement to the valve body 21 while not imparting rotation to the valve body. This allows for the imparting of thrust to the valve through a rotating rod while not rotating that valve body. It thus contributes to relatively long life of the fiber member 20.

In order to obtain movement of the valve body to the right and away from its seat in Fig. 2 against the pressure of the water, I have a further connection between the rod 13 and the valve body 21 utilizing a pin 36 running vertically through bores 37 and 38 in the valve body and through a groove 39 of the rod 13. Naturally, the groove 39 will permit the rod 13 to rotate relatively to the member 36 but will not permit substantial endwise movement. There is, of course, sufficient play between the pin 36 and the groove 39 so that thrust may be imparted against the ball 34 without interference from pin 36, and to permit of free action by the fluid pressure on tapered surface 30 of the valve body.

Referring now to Figs. 5, 6 and 7, I show my invention applied to a faucet wherein a lever handle 40 is adapted through a shaft 41 to rotate a cam 42, which in turn cooperates with the end of the rod 25 of a valve body assembly, exactly like that of Figs. 2 and 4, except that this assembly does not have a water whirling member 22. In other ways, the valve body 21 of Figs. 2 and 4. Instead of having a thrust rod 13, it utilizes a thrust rod 43 cooperating with a spring 44. The spring 44 is merely present to assist the moving of the valve body 21 and its washer 22 against the valve seat 19, but in the main, the water pressure operating against the tapered surface 30 of the valve body is relied upon, as will be readily appreciated from the description of the valve body previously described. Rotation of handle 40 actuates cam 42 and moves valve body 21 off its seat 19 to allow the flow of the water. Reverse rotation of handle 40 permits spring 44, through rod 43, assisted by the water pressure, to return valve body 21 against its seat.

Referring now to Figs. 8 and 9, I show a further modified form of my invention in which I utilize a spray gun having a spray forming portion separate from the valve body 21. In the modification of Figs. 8 and 9, the main body of the gun is indicated by reference numeral 50 and has a manually operating member 51 mounted through means of a ball 52 in pivoting relation to a housing 53 maintained in proper position in a vertical sleeve-like extension 54 of the main body 50, through cooperation with a cap member 55. From the lower side of the ball 52 extends a cam pin 56 entering a slot 57 of a thrust imparting rod 58, which has secured thereto at its extreme left a spray forming member of the type described in connection with Fig. 2, or of the type illustrated in Figs. 10–14, inclusive.

The valve body 21 of Fig. 9 is in all particulars like that of the valve body 21 of Fig. 5 and operates just like that of Fig. 5, to permit the flow of fluid when the end 58a of the rod 58 is moved against the rod portion 25. It will of course be noted that the manually operated member 51 will first move the valve body 21 off its seat 19 just as in the modification of Fig. 2, and will thereafter move the spray forming member to spray forming position.

Referring now to Figs. 10–14, I show a modified form of my invention in which water whirling grooves 60 are formed in a water whirling bore 61, instead of on a spray forming member 62 as in the first modification described. The spray forming bore 61 is formed in a nozzle member 63 which is secured through screw threads to an intermediate member 64 which is secured in turn through screw threads to the main pipe member of my spray head 65, all as is best illustrated in Figs. 10 and 14.

A valve body 66 having fins 67 similar to those of the first modification, is secured through a pin 68 to the rotating and endwise moving rod 69. The operation of the rod 69 for moving the valve body 66 is the same as in the first modification described, except that the pin 68 traversing as it does bores 70 and 71 in the valve body and rod 69, secures the valve body and rod for rotation together as the rod is rotated through means described in the first modification.

As has already been indicated, it is necessary that that portion of the valve body which actually fits against the valve seat, in this case a rubber washer 72, be maintained against rotation as the valve body is driven toward its seat. Because the main valve body 66 is rotatable, I mount the washer 72 on a valve portion 73, which valve portion 73 carries also the spray forming member 62. This member 62 is screw threaded on to a threaded post 74 extending from the valve portion 73. The valve portion 73 is formed with a headed end 75 having a shallow bore 76 and separated from the main body of valve portion 73 by a neck 77. The valve body 66 is slotted at 78 for the insertion of head 75 of the valve portion 73, as is probably best shown in the exploded view, that is, Fig. 13. Once the valve portion 73 is moved so that its head 75 is within the slot 78, it is of course secured against endwise movement relatively to the valve body 66, and will thereafter move endwise with the body 66.

In actually assembling the parts, the head 75 is inserted into the slot 78 before the rod 69 is moved into its bore 79 in the valve body 66. As the rod 69 thereafter moves into the bore 79, it also enters the bore 76 of the head 75, as is probably best illustrated in Fig. 10. Thereafter, when the pin 68 is driven home securing the valve body to rod 69, the end of the rod 69 lies within the bore 76 and secures the valve portion 73 against movement relatively to the valve body 66, that is, it secures the head 75 of portion 73 against movement out of slot 78. With the parts so assembled, it is quite obvious that the valve portion 73 while moving endwise, will not rotate as the valve body 66 is rotated by the rod 69.

It will be noted especially from Figs. 10 and 11, that when the rubber washer 72 is against its valve seat shutting off the flow of water into the spray forming bore 61, the end of the spray forming member 62 covers the ends of the water whirling grooves 60. Therefore, even should liquid leak past the washer 72, it will not be able to move through the grooves 60 to form a spray. Incidentally, the grooves 60 may be of varying width, or varying depth, and may assume any contour which is desired for particular work.

Once the valve body and valve portion 73 are moved to withdraw the washer 72 from its seat, water will be exposed to the water whirling grooves 60. However, the initial withdrawal of the washer 72 from its seat will be accomplished before spray forming member 62 exposes the ends of the water whirling grooves 60. Therefore, further movement of the valve body 66 and spray forming member 62 is necessary to finally expose the water whirling grooves 60, as is best illustrated in Fig. 10, whereupon the water or other liquid flowing past the washer 72 and its valve seat will be allowed to move through the water whirling grooves 60 and through the spray forming bore 61, all as will be well understood by those skilled in the art.

As will be best noted by viewing Fig. 10, my rubber washer 72 rests against a concave surface 80 of the valve portion 73. The end surface of the spray forming member 62 is also formed concave and presses against the other face of the washer 72. It is therefore apparent that the rubber washer 72 is pressed between two concave surfaces so as to be maintained always firmly against concave surface 80, which is the surface from which it will tend to separate under the influence of water pressure.

I now claim:

1. In a device of the class described, a pipe, a freely rotating valve body in said pipe, a water whirling member carried by said valve body, and fins on said body supporting the body in central position in said pipe and of such size that the water pressure on the fins will maintain the body against rotation.

2. In a device of the class described, a pipe, a freely rotating valve body in said pipe, a water whirling member carried by said valve body, fins on said body supporting the body in central position in said pipe and of such size that the water pressure on the fins will maintain said body against rotation, and means in thrust relation to said valve body adapted to move it against a valve seat in said pipe.

3. In a device of the class described, a pipe, a freely rotating valve body in said pipe, a water whirling member carried by said valve body, fins on said body supporting the body in central position in said pipe and of such size that the water pressure on the fins will maintain said body against rotation, a rotating thrust imparting rod in said pipe, and a ball between said rod and valve body whereby said rod may apply thrust but not rotation to said valve body to move it against a valve seat in said pipe.

4. In a device of the class described, a pipe, a freely rotating valve body in said pipe, a water whirling member carried by said valve body, fins on said body supporting the body in central position in said pipe and of such size that the water pressure on the fins will maintain said body against rotation, a rotating thrust imparting rod in said pipe, a ball between said rod and valve body whereby said rod may apply thrust but not rotation to said valve body to move it against a valve seat in said pipe, and additional means of connection between said valve body and rod whereby said rod may move said valve body away from said valve seat against the water pressure in said pipe.

5. In a device of the class described, a pipe, a freely rotating valve body in said pipe, a water whirling member carried by said valve body, and fins on said body supporting the body in central position in said pipe and of such size that the water pressure on the fins will maintain the body against rotation, the body of said valve from which said fins extend being tapered whereby the water pressure thereagainst urges the valve body against a valve seat in said pipe.

6. In a spray gun of the class described, a pipe having a spray forming bore, a water whirling spray forming member in said spray forming bore and of substantially the same diameter as said bore so that the water will pass with difficulty through said bore, water whirling grooves on said spray forming member terminating at a point on said member maintained within said bore and out of access to the water, said grooves being of gradually increasing depth, and manually rotatable means for moving said member to withdraw part of it from said bore to expose said grooves whereby to allow the water to traverse said grooves and said bore.

7. In a spray gun device of the class described, a pipe, a valve seat therein, a valve body adapted to move against said seat, a spray forming bore, a water whirling spray forming member of a diameter substantially that of said spray forming bore adapted to slide in said bore, manually rotatable means for moving said valve body away from said seat and to slide said member in said bore, water whirling grooves on said member terminating at a point on said member maintained within said bore when said valve body is against said valve seat whereby said valve body must be moved off said seat prior to the exposure of said water whirling grooves, the said grooves being of gradually increasing depth whereby the movement of said member out of said bore will vary the consistency of the whirling spray formed by said grooves.

8. In a device of the class described, a pipe having a valve seat and a spray forming bore, a valve body in said pipe having a portion adapted to fit against said seat, a water whirling spray forming member extending from said valve body into said spray forming bore and of a diameter substantially that of said spray forming bore, water whirling grooves on said member terminating at a point on said member maintained within said bore when said valve body is against said valve seat, whereby said valve body must be moved off said seat prior to the exposure of said water whirling grooves, and fins on said valve body adapted to cooperate with the water pressure for maintaining said valve body against rotation due to the reaction between the water and said water whirling grooves.

9. In a combination of the class described, a valve body, a rod, a pin traversing said valve body and rod for securing the two for integral movement one with the other, a valve seat member adapted for longitudinal movement with said valve body and rod while free to rotate relatively thereto substantially for the purpose described, said valve body having a slot and said valve seat having a part movable into said slot whereby to be secured thereafter against longitudinal movement relatively to said valve body, and a portion of said rod entering a bore in said valve seat member when said rod is connected with said valve body through said pin, whereby said rod maintains said valve seat member against movement out of said slot while allowing rotation of said valve seat member relatively to said valve body in the axis of said rod.

10. In a combination of the class described, a valve body, a rod, means securing said valve body and rod for longitudinal movement, a valve seat member adapted for longitudinal movement with said valve body and rod while free to rotate relatively thereto substantially for the purpose described, said valve body having a slot and said valve seat having a part movable into said slot whereby to be secured thereafter against longitudinal movement relatively to said valve body, and a portion of said rod entering a bore in said valve seat member when said rod is connected with said valve body through said means, whereby said rod maintains said valve seat member against movement out of said slot while allowing rotation of said valve seat member relatively to said valve body in the axis of said rod.

LEEMAN F. STROUT.